(12) United States Patent
Schweigert

(10) Patent No.: US 7,347,794 B2
(45) Date of Patent: Mar. 25, 2008

(54) METHOD OF MANUFACTURING A FACE PLATE FOR A GOLF CLUB HEAD

(75) Inventor: Bradley D. Schweigert, Anthem, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 80 days.

(21) Appl. No.: 10/803,837

(22) Filed: Mar. 17, 2004

(65) Prior Publication Data

US 2005/0209019 A1 Sep. 22, 2005

(51) Int. Cl.
*A63B 53/04* (2006.01)
(52) U.S. Cl. ...................... 473/342; 473/345
(58) Field of Classification Search ......... 473/324–350
See application file for complete search history.

(56) References Cited

U.S. PATENT DOCUMENTS

| | | | |
|---|---|---|---|
| 4,511,145 A | | 4/1985 | Schmidt |
| 6,319,150 B1 * | | 11/2001 | Werner et al. ............. 473/349 |
| 6,354,962 B1 | | 3/2002 | Galloway et al. |
| 6,428,426 B1 * | | 8/2002 | Helmstetter et al. ........ 473/330 |
| 6,428,427 B1 * | | 8/2002 | Kosmatka ................... 473/349 |
| 6,471,600 B2 * | | 10/2002 | Tang et al. ................. 473/242 |
| 6,569,033 B2 * | | 5/2003 | Kosmatka ................... 473/329 |
| 6,602,149 B1 * | | 8/2003 | Jacobson .................... 473/329 |
| 6,605,007 B1 * | | 8/2003 | Bissonnette et al. ........ 473/329 |
| 6,623,377 B2 * | | 9/2003 | Evans et al. ................ 473/342 |
| 6,800,037 B2 * | | 10/2004 | Kosmatka ................... 473/329 |
| 6,863,626 B2 * | | 3/2005 | Evans et al. ................ 473/342 |
| 6,899,638 B2 * | | 5/2005 | Iwata et al. ................. 473/329 |
| 2003/0195058 A1 | | 10/2003 | Rice et al. |

FOREIGN PATENT DOCUMENTS

JP 2003019233 A * 1/2003

OTHER PUBLICATIONS

Screen shot from TaylorMade web site www.taylormadegolf.com.

* cited by examiner

*Primary Examiner*—Eugene Kim
*Assistant Examiner*—Alvin A Hunter
(74) *Attorney, Agent, or Firm*—Darrell F. Marquette; Franki Ho

(57) ABSTRACT

A golf club is manufactured by machining away a portion of the rear surface of a club face blank to form an elliptical central thickened region that tapers through a transition region to a thinner peripheral region. The elliptical central thickened region, transition region and the portion of the peripheral region surrounding the raised portion are formed in a single elliptical pass with a special cutting tool. The cutting tool, or "form cutter" has a conical lateral cutting surface, which forms the sloped transition region and the peripheral region surrounding it in a single operation.

29 Claims, 4 Drawing Sheets

METHOD OF MANUFACTURING A FACE PLATE FOR A GOLF CLUB HEAD

BACKGROUND OF THE INVENTION

This invention relates generally to golf clubs and, in particular, to so-called metal wood drivers.

Recent developments in golf club design have included improvements in drivers, which are clubs used primarily to strike a golf ball resting on a golf tee. These improvements have resulted in drivers with club heads consisting of a hollow shell usually made of metal, such as steel, aluminum, or titanium. These hollow shells have relatively thin walls including a thin front wall that is used to impact the golf ball. In order to prevent the front wall of these hollow shells from permanently deforming or cracking upon ball impact, it has become necessary to reinforce the front wall. One example of a golf club head consisting of a hollow metal shell with a reinforced front wall is disclosed in U.S. Pat. No. 4,511,145 to Schmidt. The club head disclosed in the Schmidt patent has an arched ridge extending between the heel and toe ends of the front wall. The arched ridge design of the Schmidt provides adequate reinforcement for drivers of moderate head volume, however, in an effort to obtain better and better performance from these hollow metal wood drivers, golf club manufacturers have increased the head volume from the moderate volume of 200 cc's to over 400 cc's during the past decade. As head size increases, less and less material is available to reinforce the front wall of the club face within acceptable weight limitations (i.e., around 200 grams mass). Consequently, more exotic materials such as forged or cold rolled titanium faces welded to a cast titanium body have been utilized in these super-oversized drivers. The rear surfaces of the front walls of these super-oversized drivers must be carefully contoured to provide adequate structural strength with a minimum amount of material.

The most critical region to reinforce, is, of course, the ideal ball impact point of the front wall. Because most golfer's swings vary somewhat from impact to impact, the reinforced region of the front wall must be distributed around the ideal impact point. However, since variations in a golfer's swing tend to be more in the heel and toe direction, rather than up or down, the distribution of hits tends to be within a horizontal, elliptical region rather than a circular region centered around the center of the club face. Accordingly, an elliptical, rather than a purely circular reinforcement is preferable. One example of a golf club head having a face with a contoured rear surface is U.S. Pat. No. 6,354,962 to Galloway, et al. The club head disclosed in Galloway has a face plate reinforced with elliptical regions that are formed as part of the forging process of the face plate. For clubs in which the club face is machined from a wrought alloy sheet or other sheet material, forming an elliptical reinforced region presents special problems. The face cannot be machined properly on a lathe because the lathe will produce only a circular reinforced region. One manufacturer is known to use an end mill that makes multiple elliptical passes to machine the reinforced region of the golf club face. This operation is, however, time consuming and unnecessarily costly.

SUMMARY OF THE INVENTION

According to the present invention, a golf club head is manufactured by removing a portion of the rear surface of a face plate to form a central thickened region surrounded by a transition region that tapers to a thinner peripheral region. According to the illustrative embodiment, the face plate is a rolled sheet titanium alloy between 0.130 and 0.180 inches thick, a portion of the transition region of which is machined away to leave the central thickened region and to form the transition region and the thinner peripheral region. Rather than forming the rear surface contour of the face plate by making multiple passes with an end mill, however, the central portion, the transition region and the peripheral region are formed in a single elliptical pass with a special cutting tool. The cutting tool, or "form cutter" has a conical lateral cutting surface, which forms the transition region and the peripheral region in a single operation. Use of this form cutter to machine the transition region and peripheral region in a single operation yields greater uniformity in the rear surface contour of the face plate and saves substantial time and money over prior art multiple pass machining operations.

BRIEF DESCRIPTION OF THE DRAWING

The present invention will be better understood from a reading of the following detailed description, taken in conjunction with the accompanying drawing figures in which like references designate like elements, and in which.

DETAILED DESCRIPTION

Figure 1:
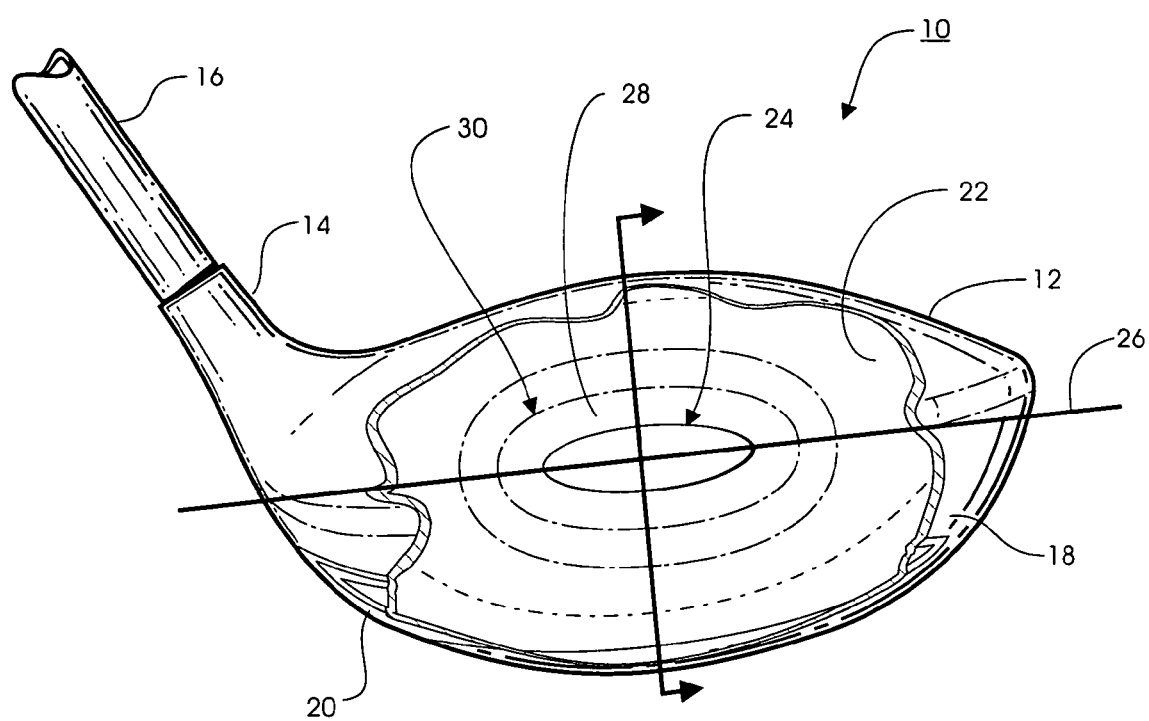
FIG. 1 is a partially cut-away rear perspective view of a golf club incorporating features of the present invention.

The drawing figures are intended to illustrate the general manner of construction and are not necessarily to scale. In the description and the in the drawing figures, specific illustrative examples are shown and herein described in detail. It should be understood, however, that the drawing figures and detailed description are not intended to limit the invention to the particular form disclosed but are merely illustrative and intended to teach one of ordinary skill how to make and/or use the invention claimed herein and for setting forth the best mode for carrying out the invention.

Referring to FIG. 1, a golf club 10 includes a head 12, a hosel 14 and a shaft 16. Head 12 includes a hollow body 18 made of a metal material such as titanium. Hollow body 18 is formed as a shell 20, which may be assembled from a series of forged pieces but, in the illustrative embodiment, comprises a titanium investment casting. A face plate 22 is attached by conventional means such as plasma or electron beam welding to a corresponding opening 23 (FIG. 2) in shell 20 to form hollow body 18. Face plate 22 may be a conventional forged blank but, in the illustrative embodiment, comprises a rolled sheet titanium blank that is machined prior to welding to shell 20 as described more fully hereinafter.

As noted hereinbefore, because a golfer's swing tends to vary more in the heel-toe direction than it does up or down, the inventor of the present invention determined that the most efficient reinforcement would be an elliptical thickened region oriented so that the major axis of the reinforced region was substantially horizontal when the club is held in its normal position for addressing the ball. Accordingly, face plate 22 includes a central thickened region 24 that is substantially elliptical in shape with its major axis 26 oriented horizontal when the club is held in its normal address position. In the illustrative embodiment, central thickened region 24 is between 0.130 and 0.180 inches in thickness. Central thickened region 24 is surrounded by a transition region 28 that tapers from the central thickened region 24 to a peripheral region 30, which in the illustrative embodiment is 0.080 to 0.120 inches thick. Transition region 28 is also elliptical, however, for reasons that are explained more fully hereinafter, the major axis and minor axis of transition region 28 are a fixed amount larger than the respective major and minor axis of central thickened region 24. Accordingly, the aspect ratio of transition region 28 is lower than the aspect ratio of central thickened region 24 (in other words, transition region 28 is a "fatter" ellipse than central thickened region 24). As used herein, the "aspect ratio" of an elliptical region is defined to mean the major axis of the ellipse divided by the minor axis of the ellipse.

Figure 3:
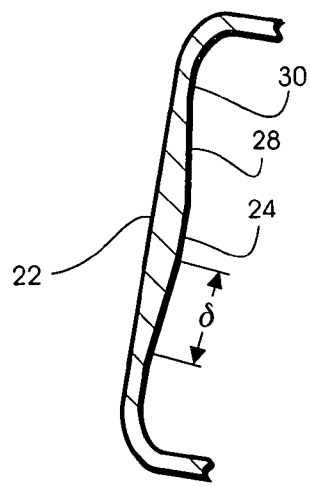
FIG. 3 is a cross-sectional view of the golf club of FIG. 2 taken along line 3-3.
Figure 4:
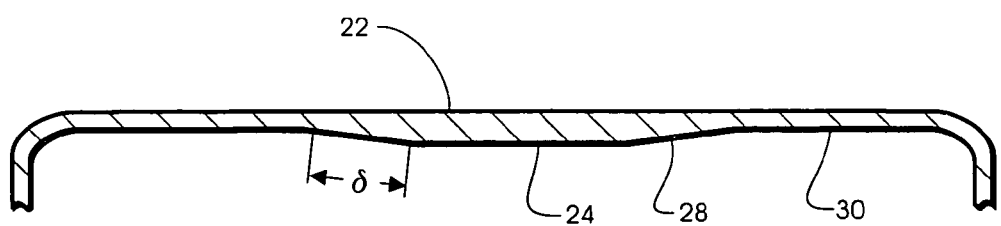
FIG. 4 is a cross-sectional view of the golf club of FIG. 2 taken along line 4-4.
Figure 5:
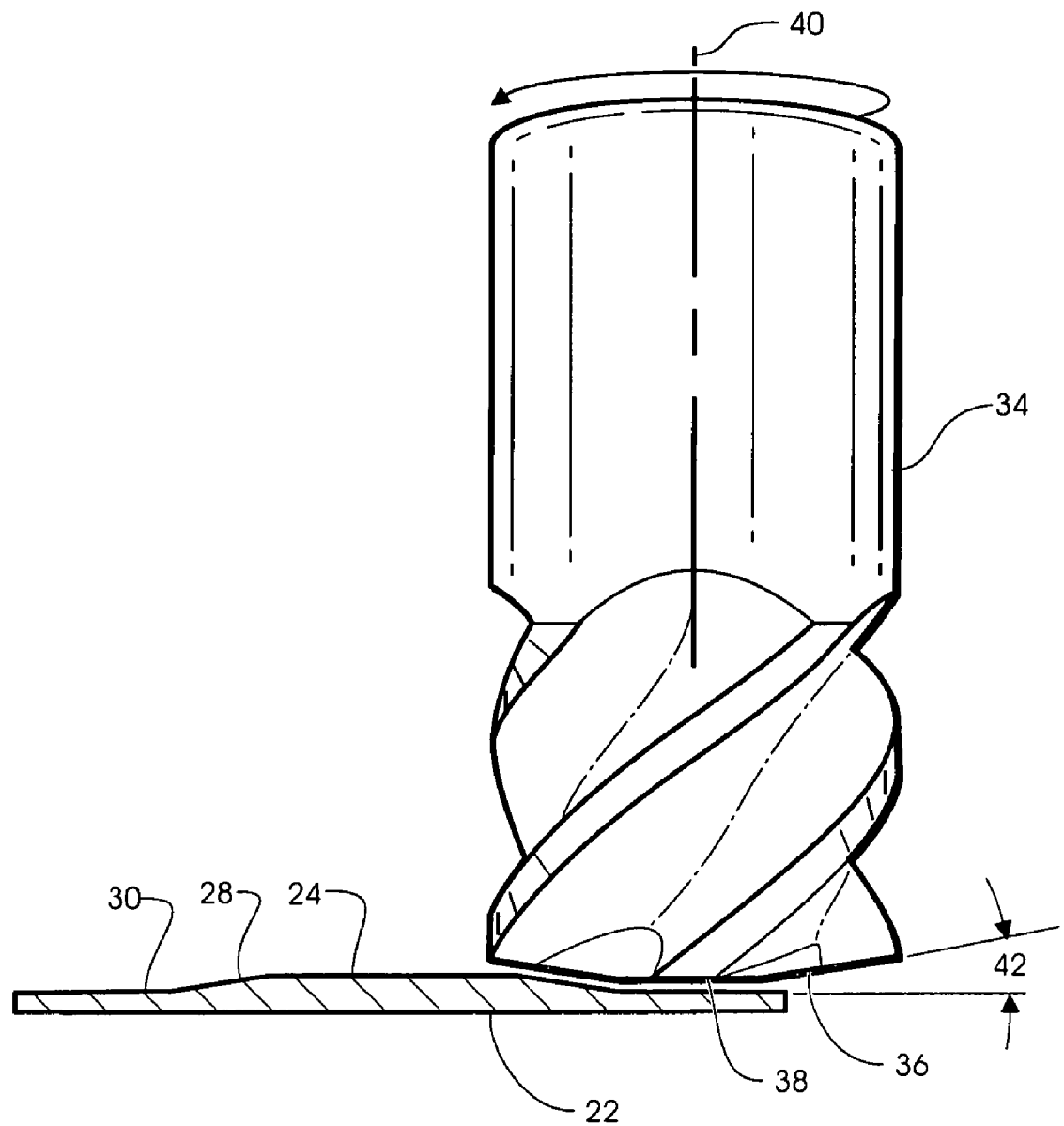
FIG. 5 is a side view of a machining step in the method of forming golf club head in FIG. 2.
Figure 6:
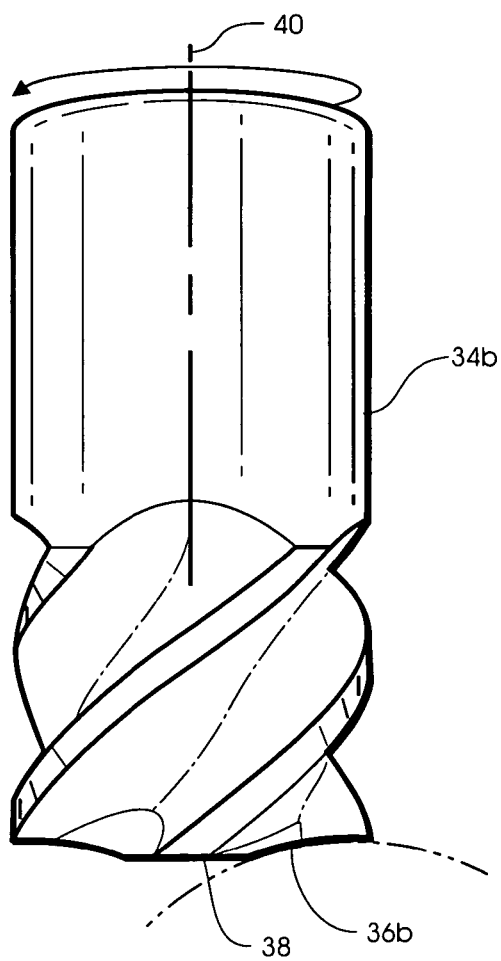
FIG. 6 is a side view of an alternative cutting tool used in the machining step of FIG. 5.
Figure 7:
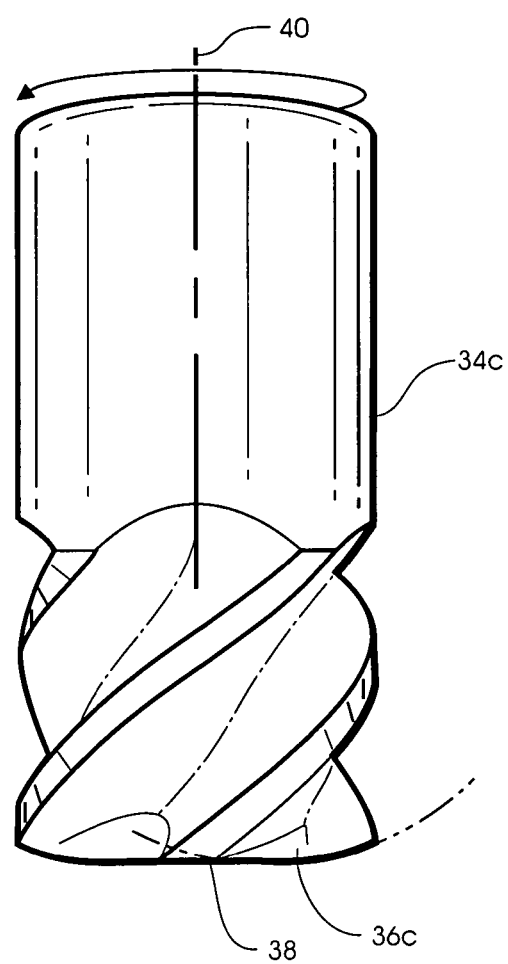
FIG. 7 is a side view of another alternative cutting tool used in the machining step of FIG. 5.

With reference to FIGS. 2-5, prior to assembly of face place 22 to shell 20, the rear contours of face plate 20 are formed by a machining operation shown schematically in FIG. 5. The process begins with a blank face plate 32, which in the illustrative embodiment comprises a blank stamped from a rolled sheet of titanium alloy. The blank face plate 32 has a thickness equal to the final thickness of the central thickened region 24 of the finished face plate 22, which as noted hereinbefore is from 0.130 to 0.180 inches in thickness. The rear surface of blank face plate 32 is machined by using a cutting tool 34 to remove a portion thereof. The tip of cutting tool 34 has a lateral cutting surface 36 and a lower cutting surface 38. Lower cutting surface 38 is perpendicular to the axis 40 of cutting tool 34. Lateral cutting surface 36 is angled upward with respect to lower cutting surface 38 by an angle 42 of from about 5 to 20 degrees, but preferably about 13 degrees such that lateral cutting surface 36 defines a generally inverted conical frustum surface of revolution as cutting tool 34 is rotated about its axis 40. Lateral cutting surface 36 may have straight edges as shown in FIG. 5, or may have edges 36b that are concave downward as in the cutting tool 34b shown in FIG. 6, or may have edges 36c that are convex downward as in the culling tool 34c shown in FIG. 7 yielding a conical frustum surface of revolution (and corresponding transition regions) having correspondingly curved sides.

Figure 2:
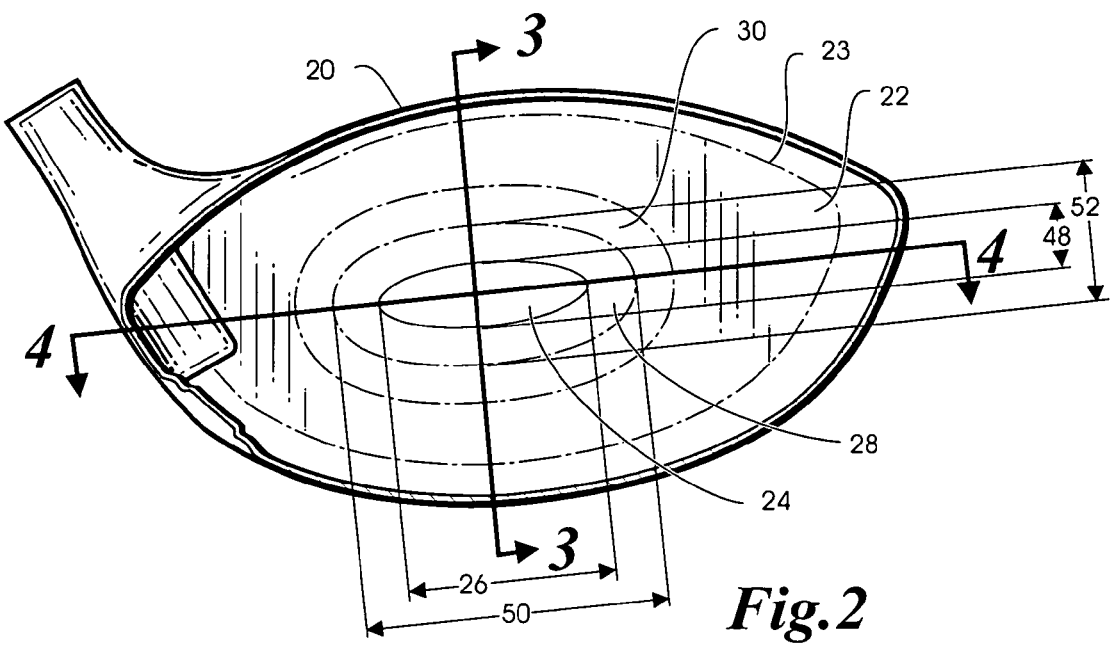
FIG. 2 is a rear cross-sectional view of the golf club of FIG. 1.

As can be seen from FIG. 5, as the lower cutting surface 38 and lateral cutting surface 36 are brought into contact with rear surface 46 of blank face plate 32, lower cutting surface 38 and lateral cutting surface 36 cooperate to cut a tapered transition region 28 and a flat perimeter region 30 simultaneously in a single pass, thus obviating the need to make multiple passes with an end mill as in the prior art. With particular reference to FIGS. 2-4, the major axis 26 of central thickened region 24 is from 0.65 to 1.05 inches in length. The minor axis 48 of central thickened region 24 is 0.25 to 0.45 inches in length. Accordingly, the aspect ratio of central thickened region 24 is between 1.4 and 4.2. In the illustrative embodiment, major axis 26 is approximately 0.85 inches and minor axis 48 is approximately 0.35 inches yielding an aspect ratio of approximately 2.4.

Major axis 50 and minor axis 52 of transition region 28 are a fixed amount "δ" greater than the respective major and minor axes of central thickened region 24. In the illustrative example, the major axis 50 and minor axis 52 are approximately 0.86 inches greater than the respective major and minor axes of central thickened region 24. Thus, major axis 50 in the illustrative embodiment is approximately 1.71 inches in length and minor axis 52 of transition region 28 is approximately 1.21 inches in length. Thus, the aspect ratio of transition region 28 is approximately 1.4 as opposed to the 2.4 aspect ratio of central thickened region 24. The high aspect ratio central raised portion surrounded by the lower aspect ratio transition region provides optimum distribution of material for improved performance and reliability.

Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention should be limited only to extent required by the appended claims and the rules and principals of applicable law.

What is claimed is:

1. A golf club head comprising:
   a face plate having a contoured rear surface, the contoured rear surface including a central thickened region having a first non-circular, elliptical outer edge surrounded by a transition region tapered from the central thickened region toward a thinner peripheral region, the transition region having a second non-circular, elliptical outer edge and a curved lateral surface extending from the first non-circular, elliptical outer edge to the second non-circular, elliptical outer edge,
   wherein the first non-circular, elliptical outer edge has a first aspect ratio, a first major axis and a first minor axis,
   wherein the second non-circular, elliptical outer edge has a second aspect ratio, a second major axis and a second minor axis, the second major axis being equal to the first major axis plus a predetermined distance and the second minor axis being equal to the first minor axis plus the predetermined distance,
   wherein the first aspect ratio is greater than the second aspect ratio, and
   wherein each point along the second non-circular, elliptical outer edge is displaced outward from the first non-circular, elliptical outer edge by an amount equal to half of the predetermined distance.

2. The golf club head of claim 1, further comprising a shell having an opening, the opening being attached to the face plate to form a hollow body.

3. The golf club head of claim 1, wherein the transition region comprises a frustum-like region having a rounded lateral surface extending from the first non-circular, elliptical outer edge to the second non-circular, elliptical outer edge.

4. The golf club head of claim 1, wherein the transition region comprises a frustum-like region having a convex lateral surface curving from the first non-circular, elliptical outer edge to the second non-circular, elliptical outer edge.

5. The golf club head of claim 1, wherein the transition region comprises a frustum-like region having a concave lateral surface curving from the first non-circular, elliptical outer edge to the second non-circular, elliptical outer edge.

6. The golf club head of claim 1, wherein the transition region comprises a frustum-like region having a lateral surface formed by at least one concave edge of a lateral cutting surface associated with a cutting device.

7. The golf club head of claim 1, wherein the transition region comprises a frustum-like region having a lateral surface formed by at least one convex edge of a lateral cutting surface associated with a cutting device.

8. The golf club head of claim 1, wherein the transition region comprises a frustum-like region having an S-shaped lateral surface curving from the first non-circular, elliptical outer edge to the second non-circular, elliptical outer edge.

9. The golf club head of claim 1, wherein cross sectional profiles of the transition region from the first non-circular, elliptical outer edge to the second non-circular, elliptical outer edge are the same when the cross sectional profiles are taken along perpendicular directions that are collinear with the major and minor axes of the second non-circular, elliptical outer edge.

10. The golf club head of claim 9, wherein the cross sectional profiles are taken along all other perpendicular directions between the first and second non-circular, elliptical outer edges.

11. The golf club head of claim 1, wherein the central thickened region comprises a constant thickness.

12. A golf club head comprising:
a face plate having a contoured surface, the contoured surface including a central region having a first elliptical outer edge surrounded by a transition region extended from the central region to a peripheral region, the transition region having a second elliptical outer edge and a thickness decreasing in a non-linear manner from the first elliptical outer edge to the second elliptical outer edge,
wherein the first elliptical outer edge has a first aspect ratio, a first major axis and a first minor axis,
wherein the second elliptical outer edge has a second aspect ratio, a second major axis and a second minor axis, the second major axis being equal to the first major axis plus a predefined distance and the second minor axis being equal to the first minor axis plus the predefined distance, and the second aspect ratio being less than the first aspect ratio.

13. The golf club bead of claim 12, wherein the transition region comprises at least one of a spherical segment-like region or a spherical frustum-like region.

14. The golf club head of claim 12, wherein the transition region comprises a frustum-like region having a rounded lateral surface extending from the first elliptical outer edge to the second elliptical outer edge.

15. The golf club head of claim 12, wherein the transition region comprises a frustum-like region having one of a convex lateral surface or a concave lateral surface curving from the first elliptical outer edge to the second elliptical outer edge.

16. The golf club head of claim 12, wherein the transition region comprises a frustum-like region formed by at least one concave edge of a lateral cutting surface associated with a cutting device.

17. The golf club head of claim 12, wherein transition region comprises a frustum-like region formed by at least one convex edge of a lateral cutting surface associated with a cutting device.

18. The golf club head of claim 12, wherein cross sectional profiles of the transition region from the first elliptical outer edge to the second elliptical outer edge are the same when the cross sectional profiles are taken along perpendicular directions that are collinear with the major and minor axes of the second elliptical outer edge.

19. The golf club head of claim 18, wherein the cross sectional profiles are taken along all other perpendicular directions between the first and second elliptical outer edges.

20. The golf club head of claim 12, wherein the central region comprises a constant thickness.

21. A golf club head comprising:
a shell having an opening; and
a face plate attached to the opening to form a hollow body, the face plate having a frustum surface of revolution, the frustum surface of revolution including a first region having a first elliptical outer edge, a second region having a second elliptical outer edge, and a transition region between the first region to a second region, the transition region having a curved side extending from the first elliptical outer edge to the second elliptical outer edge,
wherein the first elliptical outer edge has a first aspect ratio, a first major axis and a first minor axis,
wherein the second elliptical outer edge has a second aspect ratio, a second major axis and a second minor axis, the second major axis being equal to the first major axis plus a predefined distance and the second minor axis being equal to the first minor axis plus the predefined distance, and the second aspect ratio being less than the first aspect ratio.

22. The golf club head of claim 21, wherein the transition region comprises a side curved inward from the first elliptical outer edge to the second elliptical outer edge.

23. The golf club head of claim 21, wherein the transition region comprises a side curved outward from the first elliptical outer edge to the second elliptical outer edge.

24. The golf club head of claim 21, wherein the transition region comprises a frustum-like region formed by at least one concave edge of a lateral cutting surface associated with a cutting device.

25. The golf club head of claim 21, wherein transition region comprises a frustum-like region formed by at least one convex edge of a lateral cutting surface associated with a cutting device.

26. The golf club head of claim 21, wherein the frustum surface of revolution comprises a spherical frustum surface of revolution.

27. The golf club head of claim 21, wherein cross sectional profiles of the transition region from the first elliptical outer edge to the second elliptical outer edge are the same when the cross sectional profiles are taken along perpendicular directions that are collinear with the major and minor axes of the second elliptical outer edge.

28. The golf club head of claim 27, wherein the cross sectional profiles are taken along all other perpendicular directions between the first and second elliptical outer edges.

29. The golf club head of claim 21, wherein the first region comprises a constant thickness greater than any thickness of the transition region.

* * * * *